United States Patent
Valieri et al.

(10) Patent No.: US 10,791,743 B2
(45) Date of Patent: *Oct. 6, 2020

(54) EC FORMULATIONS COMPRISING ORGANOPHOSPHATE INSECTICIDES

(71) Applicant: SIPCAM SOCIETÀ ITALIANA PRODOTTI CHIMICI E PER L'AGRICOLTURA MILANO S.p.A., Milan (IT)

(72) Inventors: Gianluca Valieri, Valencia (ES); Marco Bernardini, Lodi (IT); Francesca Borgo, Milan (IT); Edoardo Russo, Piacenza (IT); Luis Hernandis Dominguez, Valencia (ES)

(73) Assignee: SIPCAM OXON S.P.A., Milan (IT)

( * ) Notice: Subject to any disclaimer, the term of this patent is extended or adjusted under 35 U.S.C. 154(b) by 142 days.

This patent is subject to a terminal disclaimer.

(21) Appl. No.: 15/572,721

(22) PCT Filed: May 2, 2016

(86) PCT No.: PCT/EP2016/059798
§ 371 (c)(1),
(2) Date: Nov. 8, 2017

(87) PCT Pub. No.: WO2016/180658
PCT Pub. Date: Nov. 17, 2016

(65) Prior Publication Data
US 2018/0139963 A1 May 24, 2018

(30) Foreign Application Priority Data

May 13, 2015 (IT) .................. 102015000014845

(51) Int. Cl.

| | |
|---|---|
| *A01N 57/16* | (2006.01) |
| *A01N 57/22* | (2006.01) |
| *A01N 57/02* | (2006.01) |
| *A01N 25/04* | (2006.01) |
| *A01N 25/30* | (2006.01) |
| *A01N 57/12* | (2006.01) |
| *A01N 57/14* | (2006.01) |
| *A01N 57/28* | (2006.01) |
| *A01N 57/30* | (2006.01) |
| *A01N 57/32* | (2006.01) |

(52) U.S. Cl.
CPC ............. *A01N 57/16* (2013.01); *A01N 25/04* (2013.01); *A01N 25/30* (2013.01); *A01N 57/02* (2013.01); *A01N 57/12* (2013.01); *A01N 57/14* (2013.01); *A01N 57/22* (2013.01); *A01N 57/28* (2013.01); *A01N 57/30* (2013.01); *A01N 57/32* (2013.01)

(58) Field of Classification Search
CPC ........ A01N 57/02; A01N 57/16; A01N 57/22; A01N 57/12; A01N 57/14; A01N 57/28; A01N 57/30; A01N 57/32; A01N 25/04
See application file for complete search history.

(56) References Cited

U.S. PATENT DOCUMENTS

| | | | |
|---|---|---|---|
| 2,879,284 A | 3/1959 | Divine et al. | |
| 2,962,521 A | 11/1960 | Usui | |
| 3,714,301 A | 1/1973 | Thomsen | |
| 4,303,640 A | 12/1981 | Fuyama et al. | |
| 4,851,217 A | 7/1989 | Mente | |
| 6,566,349 B1 | 5/2003 | Anderson et al. | |
| 2006/0084632 A1 | 4/2006 | Goyal et al. | |
| 2007/0065474 A1 | 3/2007 | Goyal et al. | |
| 2012/0053153 A1 | 3/2012 | Goyal et al. | |
| 2014/0256554 A1* | 9/2014 | Vidal | A01N 25/02 504/298 |

FOREIGN PATENT DOCUMENTS

| | | |
|---|---|---|
| WO | WO 2009/001076 A1 | 12/2008 |
| WO | WO 2014/140854 A1 | 9/2014 |

OTHER PUBLICATIONS

International Search Report and Written Opinion issued in PCT/EP2016/059798 dated Jun. 23, 2016.
"Pesticide Manual," Ed. 2013, Index 4, p. 1436.

\* cited by examiner

*Primary Examiner* — Kortney L. Klinkel
(74) *Attorney, Agent, or Firm* — Arent Fox LLP

(57) ABSTRACT

Solvent formulations under EC form comprising (% by weight): 10-40% of one or more compounds having an insecticidal activity selected from the organophosphate class; 1-20% of an additive (A) methyl or ethyl esters of carboxylic acids having a $C_{10}$-$C_{20}$ chain, saturated or unsaturated, or mixtures thereof, the fatty acids deriving from vegetal oils; 0.5-10% of an additive B) of a cellulose derivative soluble in the organic solvent of EC formulation; 3-15% of one or more surfactants selected from non ionic and anionic surfactants, or thereof mixtures; the complement to 100% being of one or more organic solvents having the following characteristics: capable to solubilize the active principle, expressed as % by weight, at room temperature (20-25° C.) for at least 5%; preferably 10%, more preferably at least 20%, immiscible with water.

15 Claims, No Drawings

EC FORMULATIONS COMPRISING ORGANOPHOSPHATE INSECTICIDES

CROSS-REFERENCE TO RELATED APPLICATIONS

This application is a National Stage entry of International Application No.: PCT/EP2016/059798, filed May 2, 2016, which claims priority to Italian Patent Application No. 102015000014845, filed May 13, 2015. The disclosure of the priority applications are hereby incorporated in their entirety by reference.

The present invention relates to insecticidal organophosphate (active) containing liquid compositions which, after dilution with water at the active application dose, do not produce the unpleasant odour due to the presence of organophosphates, or alternatively the odour is very reduced.

More specifically the present invention relates to the use of additives for reducing the odour associated with the field distribution of the agro compositions containing organophosphates as actives.

It is known that organophosphates during field distribution at the application dose develop unpleasant odours. This is a drawback for the users who carry out the field application of said insecticides.

Methods are known in the prior art for reducing the odour of the organophosphate compounds as such, by using a variety of additives.

U.S. Pat. No. 2,879,284 describes a process wherein a dithiophosphate ester is treated with an organic or inorganic peroxide or hydroperoxide. The compounds are admixed by stirring and at the end the odorless dithiophosphate ester is recovered.

U.S. Pat. No. 2,962,521 describes a process wherein a dithiophosphate ester is emulsified in an aqueous solution of an hydroxide or alkaline metal carbonate. After stirring and subsequent stratification of the liquid phases, the oily layer is separated, washed and dried, obtaining the colourless and odorless dithiophosphate ester compound.

By these prior art methods, as said, the odour from the active compounds as such can be removed. These methods cannot be applied to organophosphate formulations when diluted for field application. In practice according to the teaching of these patents it is necessary to purify the organophosphate active before it is formulated in a composition.

This represents a drawback from an industrial point of view, as in the plant for the production of the active, it is necessary to arrange an unit for purifying the product obtained by synthesis.

In U.S. Pat. No. 3,714,301 the odour of the organophosphate compounds is reduced by treatment with a compound containing nitrogen selected from nitrogen oxide (NO), $N_2O_3$, organic or inorganic nitrites. The treatment can be carried out by contacting under stirring these nitrogen-containing compounds with the organophosphate compound in the liquid state.

Also this patent, as those previously cited, describes a purification process carried out on the organophosphate compound. Therefore also the method of this patent is not applicable to reduce the odour of the formulations containing organophosphate compounds not purified before the preparation of the formulation. In the background of the patent it is also reported that the organophosphate compounds decompose in the time with formation of by-products of the mercaptan class to which, according to this patent, the unpleasant odour of these insecticides is due. It is also stated that the use of oxidizing agents, as made in the process of U.S. Pat. No. 2,879,284, in many cases leads to the substitution in the organophosphate compound of the sulphur atom with an oxygen atom. Therefore according to the prior art the treatment with oxidizing agents such as peroxides can jeopardize the chemical stability of the organophosphate compounds. The treatment described in U.S. Pat. No. 3,714,301 seems to be very effective for purifying the active.

In fact in the patent it is reported that the active remains substantially odourless even after a few weeks from the treatment, even after the compound is kept at 50° C.

In U.S. Pat. No. 4,851,217 an aqueous composition of organophosphates containing a non ionic surfactant, to which urea for reducing the odour of the formulation is added, is described.

However it is known that in aqueous formulations the organophosphate insecticides tend to crystallize and therefore the stability of the aqueous compositions of organophosphates is generally unsatisfactory.

In the agro field the need was felt to have available compositions under the EC form, thus essentially anhydrous comprising as active ingredients insecticidal compounds of the organophosphate class, wherein after dilution of the formulation with water at the active application dose the odour was substantially reduced or eliminated during the field application, and at the same time the chemico-physical stability and the biological activity of the formulation, as well as its handling and safety characteristics for the users were maintained.

In this way the user would safely carry out the field distribution of the diluted compositions if at the application dose the unpleasant odour of the organophosphates was substantially reduced or even eliminated.

Furthermore from the industrial point of view remarkable advantages would be obtained, as in the synthesis of the active the purification step of removing the odour from the organophosphate active would be eliminated.

It has been surprisingly and unexpectedly found by the Applicant that this technical problem is solved by adding to an EC composition containing insecticidal compounds selected from the organophosphate class, the additives as indicated hereinafter.

An object of the present invention are EC (emulsifiable concentrate) formulations comprising (% by weight):

10-40% of one or more actives, specifically compounds having an insecticidal activity, selected among the organophosphates comprising in the molecule the following structure, or group formula (I)):

(I)

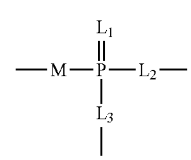

wherein:

$L_1$ is selected between oxygen and sulphur, $L_2$ and $L_3$, equal to or different from each other, are selected from oxygen, sulphur or a NH group, with the proviso that at least one from $L_1$, $L_2$ and $L_3$ is sulphur and at least one from $L_1$, $L_2$ and $L_3$ is oxygen, M is selected from oxygen, sulphur or NH;

1-20% of an additive (A) methyl and/or ethyl esters of fatty acids having a $C_{10}$-$C_{20}$ chain length, saturated or unsaturated and mixtures thereof, the fatty acids deriving from vegetal oils;

0.5-10% of an additive B) one or more cellulose derivative soluble in the organic solvent of the EC formulation;

3-15% of one or more surfactants selected from non ionic and anionic surfactants, or thereof mixtures;

the complement to 100% being one or more organic solvents having the following characteristics:
capable to solubilize the active principle, expressed as % by weight, at room temperature (20-25° C.) for at least 5%;
substantial immiscible with water.

By substantial immiscibility in water it is meant that the organic solvent is insoluble in water at room temperature (20-25° C.) at concentrations of the solvent in water higher than 3% by weight.

The compounds having insecticidal activity of the organophosphate class can be used separately or in admixture. They are characterized by the fact that they contain in the molecule the above reported group of formula (I).

The insecticides used in the formulations of the present invention are well known. See for example the book "Pesticide Manual" Ed. 2013, Index 4, page 1436, reporting the formulas of the compounds belonging to the organophosphate class and also the references to the methods for their synthesis.

Preferably the organophosphate compounds used in the EC formulation have the following formula (II):

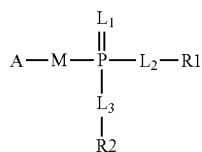

(II)

wherein:
$L_1$, $L_2$, $L_3$ and M are as defined above,
A is selected from one of the following groups:
a linear or when possible branched alkyl $C_1$-$C_{13}$, the aliphatic chain optionally containing one or more heteroatoms, preferably one or two, selected from O, S, and/or a group selected between C=O and S=O;
wherein the hydrogen atoms of the chain are optionally substituted with one or more of the following groups: halogen; CH(COOR$_3$); a radical of an ester of succinic acid of formula CH(COOR$_3$)CH$_2$(COOR$_3$), R being $C_1$-$C_4$ alkyl;
When the alkyl chain $C_1$-$C_{10}$ is linear the chain end carbon atom is optionally substituted with one or more halogen atoms;
when A alkyl is $C_1$, it is monosubstituted or bisubstituted;
when A alkyl $C_1$ is monosubstituted one hydrogen atom of the alkyl is substituted with one of the following groups: —(C=O)—NH(CH$_3$);
1,3,4-thiadiazol-2(3H)-one-yl, wherein the hydrogen atom of the carbon atom at position 5 of the ring is substituted with a group R$_3$O alcoxy;
phthalimido;
3,4-dihydro-4-oxobenzo[d]-[1,2,3]-triazinyl;
2,3-di-hydro-2-oxo-1,3-benzoxazolyl wherein the hydrogen atom of the carbon atom at position 6 of the ring is substituted with one halogen atom;
2-oxo[1,3]-oxazol[4,5-b]pyridin-(2H)-yl wherein the hydrogen atom of the carbon atom at position 6 of the pyridinyl ring is substituted with halogen;
when A alkyl is $C_1$ bisubstituted, the substituents are respectively an ethoxycarbonyl group and a phenyl group;
an aromatic ring of 6 carbon atoms having one or two substituents selected from the following group: halogen; CN; NO$_2$; SCH$_3$; R$_3$ and COOR$_3$, wherein R$_3$ is as defined above;
a substituent selected from the following:
pyridinyl substituted with one or more halogen atoms; (C=O) CH$_3$;
2-oxo-2H-chromenyl wherein two hydrogen atoms, each linked to a different carbon atom of the ring, are substituted respectively with an halogen group and a R$_3$ group as defined above;
pyrimidinyl wherein an hydrogen atom of one or two carbon atoms of the ring is substituted with a group selected from halogen, R$_3$ as defined above, diethylamino;
1,2-oxazolyl wherein the hydrogen atom of a carbon atom of the ring is substituted with a phenyl group;
pyrazolyl substituted with one phenyl group, said phenyl being optionally substituted with an halogen atom;
1,6-dihydro-6-oxo-pyridazinyl wherein an hydrogen atom of a carbon atom of the ring is substituted with a phenyl group; R1 and R2, equal to or different from each other, have the following meanings: hydrogen, linear or when possible branched $C_1$-$C_{10}$ alkyl, for example —CH$_3$, —C$_2$H$_5$, —C$_4$H$_9$; optionally when the alkyl chain of R1 and R2 is linear one or two COOR$_3$ groups are linked to the aliphatic chain end carbon atom.

When A is $C_1$-$C_{10}$ alkyl, the alkyl is preferably $C_1$-$C_4$ alkyl and in the aliphatic chain the optional heteroatom substituent is sulphur and the optional substituent group is S=0; halogen is preferably chlorine and the R$_3$ alkyl of the ester group is $C_1$H$_5$.

When A is $C_1$ alkyl the phthalimido substituent is linked to the $C_1$ alkyl through the nitrogen atom; when the substituent is the group [1,3,4-thiadiazol-2(3H)-one-yl] one hydrogen atom of the carbon atom at position 5 of the ring is substituted with OCH$_3$, the nitrogen atom at position 3 of the ring is linked to A=C$_1$ alkyl; when the substituent is 3,4-dihydro-4-oxobenzo[d]-[1,2,3]-triazinyl the nitrogen atom at position 3 of the triazine is linked to A-C$_1$ alkyl; in the case of 2,3-dihydro-2-oxo-1,3-benzoxazolyl and of 2-oxo[1,3]-oxazole[4,5-b]pyridin-3(2H)-yl the halogen atom linked to the carbon atom at position 6 is chlorine; the nitrogen atom at position 3 of 2,3-dihydro-2-oxo-1,3-benzoxazolyl is linked to A-C$_1$ alkyl; the nitrogen atom at position 3 of 2-oxo[1,3] oxazole[4,5-b]pyridin-(2H)-yl is linked to A=C$_1$ alkyl.

When A is a linear alkyl $C_1$-$C_{10}$ the one or more halogen atoms optional substituents of the chain end carbon atom are chlorine; when the $C_1$-$C_{10}$ chain is ethyl, on the carbon atom adjacent to the atom M in formula II preferably one hydrogen atom is substituted with chlorine and on the other carbon atom the three hydrogen atoms of the methyl group are substituted with chlorine atoms.

When A is an aromatic ring as defined above one hydrogen atom at para position of the aromatic ring is optionally substituted with one group selected from halogen, selected from bromine and chlorine; CN; NO$_2$; SCH$_3$; when in the aromatic ring in para position there is an halogen atom in ortho position there is a chlorine atom; when in para position there is a $NO_2$ group, a methyl group is optionally present in meta position; when in para position there is a group $SCH_3$, there is a methyl group in meta position; the group $COOR_3$ is preferably in ortho position.

$R_3$ alkyl of $COOR_3$ is preferably $C_3H_7$, more preferably it is isopropyl.

When A is pyridinyl, the carbon atom linked to the atom M of formula II is at position 2 of the pyridinyl ring and one hydrogen atom of the carbon atoms respectively at position 3, 5 and 6 of the ring is substituted with one halogen atom, preferably chlorine.

When A has the meaning of $-(C=O)CH_3$, M in formula II is NH.

When A is a 2-oxo-2H-chromenyl substituent, radical of coumarin, the carbon atom at position 7 of the ring is linked to M, one hydrogen atom linked to the carbon atom at position 3 is substituted with one chlorine atom and one hydrogen atom linked to the carbon atom at position 4 is substituted with methyl.

When A has the meaning of pyrimidinyl, the carbon atom linked to M is at one of the following positions of the pyrimidinyl ring: 2, 4 or 5; when there is an halogen substituent preferably is chlorine; the $R_3$ group, when present, is preferably at position 6 and it is preferably $C_3H_7$, more preferably isopropyl; and also at position 4 a $CH_3$ group is optionally present; when at position 6 there is a $CH_3$ group, at position 2 a diethylamino group is optionally present; preferably one hydrogen atom linked to the carbon atom at position 2 is substituted with $C_4H_9$, preferably $C_4H_9$ is tert-butyl.

When A has the meaning of 1,2-oxazolyl, the carbon atom of the oxazole ring at position 3 is linked to M, the phenyl substituent is preferably linked to the carbon atom at position 5 of the oxazole ring.

When A is a pyrazolyl substituent, the phenyl substituent is linked to the nitrogen atom at position 1; the halogen substituent of the phenyl ring is preferably chlorine and is in para position; the carbon atom of the pyrazolyl ring at position 4 is linked to M.

When A has the meaning of 1,6-dihydro-6-oxo-pyridazinyl, the carbon atom at position 3 of the ring is linked to M; the phenyl group is linked to the nitrogen atom at position 1 of the ring.

In particular the preferred organophosphate compounds are the following: Acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlofenthion, dichlorvos, dicrotophos, dimethoate, dimethylvinphos, disulfoton, ethoprophos, famphur, fenamiphos, fenitrothion, fenthion, heptenophos, isofenphos-methyl, isopropyl-O-(methoxyamino thiophosphoryl) salicylate, isoxathion, malathion, methamidophos, methidathion, mevinphos, monocrotophos, naled, omethoate, oxydemeton-methyl, parathion, parathion-methyl, phenthoate, phorate, phosalone, phosmet, phosphamidon, pirimiphos-methyl, profenofos, prothiofos, pyraclofos, pyridaphenthion, quinalphos, tebupirimfos, temephos, terbufos, thiometon, triazophos, trichlorfon, vamidothion. The most preferred are chlorpyrifos, chlorpyrifos methyl, dimethoate, phosmet.

Preferably the amount of the organophosphate compounds in the EC formulation, expressed as percent by weight, is comprised between 20 and 25%.

The fatty acids $C_{10}$-$C_{20}$ saturated or unsaturated and mixtures thereof that are used in the form of their corresponding methyl and/or ethyl esters as additive A) in the formulations of the present invention, as said, derive from vegetal oils. These fatty acids methyl and/or ethyl esters are commercially known also with the trade name biodiesel. These esters are obtained by transesterification of vegetal oils with methyl or ethyl alcohol. Preferably the vegetable oils used are rape oil, soya oil, sunflower seed oil, canola, etc.

The chain of said $C_{10}$-$C_{20}$ vegetable acids can contain one or more unsaturations of the ethylene type, preferably in a number not higher than 3 and preferably in alternated positions along the chain. Still more preferably the unsaturations are not adjacent, i.e. there is no carbon atom bearing two double bonds.

As fatty acids derived from vegetal oils the following can be cited: lauric acid, myristic acid, palmitic acid, stearic acid, linoleic acid, linolenic acid, oleic acid.

Preferably as additive A) methyl esters of vegetable acids $C_{10}$-$C_{20}$ are used.

The fatty acids have preferably a $C_{12}$-$C_{18}$ chain length.

The ethyl and/or methyl esters of the carboxylic $C_{10}$-$C_{20}$ acids known with the trade name biodiesel used in the present invention are characterized by the following analytical parameters:

| | |
|---|---|
| Acid value (mg KOH/g) | ≤1 |
| Iodine value (g $I_2$/100 g) | 105-120 |
| Residual water (% by weight) | ≤0.2 |
| Density at 25° C. (g/ml) | 0.875-0.877 |

The additive B) is preferably in an amount, expressed as percent by weight with respect to additive A), from 5 and 40%, the amount of additive B), referred to the composition of the EC formulation (% by weight) being preferably in the range ≥0.5% and ≤8%.

The additive B) must be soluble at the above given concentrations in the solvent of the EC formulation, giving clear solutions.

Generally one part by weight of additive B) is soluble at room temperature (20-25° C.) in at least 1-5 parts of the used solvent.

The additive B) is preferably selected from the group of alkylethers of cellulose and esters of carboxyalkylcellulose. When additive B) is an alkylether of cellulose, the alkyl of the alkylether is $C_1$-$C_5$; as alkylethers of cellulose, methylcellulose, ethylcellulose, propylcellulose, butylcellulose can for example be mentioned.

When additive B) is an ester of a carboxyalkylcellulose, the ester group has a $C_1$-$C_4$ alkyl chain and the alkyl of carboxyalkylcellulose is $C_1$-$C_4$.

Preferably the active is soluble in the organic solvent of the formulations of the present invention for at least 10%, more preferably for at least 20% by weight.

The active concentration in the solvent of the EC formulation in the range % by weight set forth above is such that preferably the active is dissolved in the solvent giving a clear limpid solution at room temperature.

Generally the organic solvents used in the formulations of the present invention have a volatility lower than 0.10 according to ASTM D3539 (ref.: butylacetate=1); or a volatility higher than 100 according to DIN 53170 (ref.: ethyl ether=1).

Examples of organic solvents that can be used in the EC formulations of the present invention are the following:

$C_7$-$C_{20}$, preferably $C_7$-$C_{16}$ alkylbenzenes and mixtures thereof, wherein the alkyl is linear or branched; xylene, Solvesso® 150, Solvesso® 200, Solvesso® 150 ND, Solvesso® 200 ND can for example be mentioned, preferably said alkylbenzenes are free from naphthalene residues, such as for example the alkylbenzenes known with the commercial names of Solvesso® 150 ND, Solvesso® 200 ND;

alkyl esters $C_7$-$C_9$ of acetic acid, wherein the alkyl is linear or branched, preferably linear. For example heptylacetate (Exxate® 700, Exxate® 900) can be mentioned.

In the EC formulation of the invention mixtures of the above mentioned organic solvents can also be used.

The surfactants are present in the formulation of the present invention in an amount comprised between 5 and 12% by weight.

The surfactants that can be used in the EC formulations of the present invention are selected from non ionic and anionic surfactants.

The non ionic surfactants are for example selected from the following: linear or branched polyethoxylated $C_{10}$-$C_{18}$ fatty alcohols, wherein the ethoxyl number (EO) preferably ranges from 5 to 10; polyethoxylated castor oil wherein the ethoxyl number preferably ranges from 15 to 40, more preferably 25-35; polyethoxylated distyrylphenols having an ethoxyl number preferably comprised between 12-25, more preferably 15-20; polyethoxylated tristyrylphenols having an ethoxyl number 15-40, preferably 16-25; $C_{12}$-$C_{18}$ mono- di and tri-esters of polyethoxylated sorbitan wherein the ethoxyl number ranges from 4 to 20, for example sorbitan monolaurate 4-20 EO, sorbitan monopalmitate 20 EO, sorbitan monostearate 4-20 EO, sorbitan trioleate 20 EO, sorbitan tristearate 20 EO, sorbitan monooleate 20 EO, commercially known as Tween 80®; $C_{10}$-$C_{16}$ alkyl polyglycosides (ethers of pyranosides or their oligomers), optionally polyethoxylated or polypropoxylated, generally commercially available in mixtures wherein said alkylpolyglycosides have a different ethoxyl or propoxyl number, generally comprised between 10 and 25; polyethoxylated-polypropoxylated $C_8$-$C_{14}$ aliphatic alcohols; polyaryl phenolethoxylated wherein the ethoxyl/propoxyl number is comprised between 15 and 40.

The anionic surfactants are preferably selected from the following: alkaline or alkaline-earth salts of $C_8$-$C_{16}$ alkyl-benzensulphonates, for example calcium dodecyl-benzensulphonate; alkaline or earth-alkaline salts of $C_{10}$-$C_{14}$ alkyl-sulphates, preferably the corresponding calcium or sodium salts.

Preferably in the formulation of the present invention mixtures of non ionic and anionic surfactants are used.

In the mixtures of non ionic and anionic surfactants the percentage of non ionic surfactants is preferably comprised between 40 and 80%, preferably 40-70%, referred to the total percent weight of the surfactants in the EC formulation.

The EC formulations of the present invention in addition to organophosphate insecticides, optionally contain pesticides of classes different from the organophosphates. These optional pesticides are selected depending on the intended application, with the proviso that the added optional pesticides are soluble at the used concentrations in the organic solvent of the emulsifiable concentrate (EC). In this case the solvent percentage in the formulation is decreased of an amount equal to that of the optional pesticides added for maintaining 100% by weight of the composition. The amounts of the optional pesticides added are those known in the prior art.

A further object of the present invention is a process for preparing the EC formulation, comprising the following steps:

a) solubilization of the organophosphate active and of the optional pesticide in the organic solvent used for the EC preparation, b) addition of one or more surfactants selected from non ionic and anionic surfactants or thereof mixtures, c) addition of the additive A) and of additive B), optionally by heating at temperatures not higher than about 40° C. to obtain a limpid liquid composition.

In steps a) and c) the compounds dissolved in the solvent of the EC formulation give a solution that at room temperature is clear (limpid).

A further object of the present invention is the use of additive A) in admixture with additive B, as defined above, to reduce the odor deriving from the field distribution of the solvent formulations under the EC form, diluted with water at the application dose, and containing as active one or more insecticidal compounds of the organophosphate class.

As said, the Applicant has surprisingly and unexpectedly found that the addition of the mixture of additives A) and B) of the present invention to solvent formulations under EC form, containing as active one or more organophosphate compounds as defined above, diluted with water at the application dose, allows to substantially reduce or eliminate the odor developed during field distribution in field of these insecticides.

Furthermore the Applicant has surprisingly and unexpectedly found that the chemico-physical stability, the biological activity, the handling and safety characteristics are substantially maintained when to the EC formulations the additives of the present invention as defined above are added.

The following examples are given for illustrative and not limitative purpose of the present invention.

EXAMPLES

Characterization

Acid Value

The determination is carried out according to AOCS cd 3d-63.

Iodine Value

The determination is carried out according to Oleon OA-020.

Residual Water

The determination is carried out according to AOCS Ca 2e-84.

Density

The determination is carried out according to ISO 3675.

Odour Evaluation

A field application in an orchard has been simulated by using an atomizer. 300 ml of the formulated product have been diluted in 100 l (liters) of water. About 1500 l/ha have been used.

A group of 9 persons was trained for odour evaluation according to the following score numerical scale:

| | |
|---|---|
| 0 | No odour |
| 1 | The operator perceives an unusual odour, but he cannot be sure if it can be attributed to the insecticidal treatment. |
| 2 | The operator perceives an unusual, but not unpleasant, odour, that he attributes to the insecticidal treatment |
| 3 | The operator perceives an unusual odour, slightly unpleasant, that he attributes to the insecticidal treatment |

| | |
|---|---|
| 4 | The operator perceives an unpleasant odour and he feels uncomfortable to stay near the treated area |
| 5 | The operator perceives a very unpleasant odour and he feels as air is almost unbreathable to the point that he cannot stay in that place for a long time. |
| 6 | The odour perceived is extremely unpleasant to the extent that for him it is impossible to remain in that place. |

Three evaluation meeting assessments respectively at 2, 6 and 24 hours from the application in field have been overall carried out. The numerical values of the scores processed by statistical computing by using an ARM software. The statistical analysis has been based on Bartlett's test and Student-Newman-Keuls (S-N-K) multiple comparison test.

Example 1

Preparation of an EC Formulation Containing Chlorpyriphos-Methyl 23 g of technical chlorpyriphos-methyl having 97% purity are mixed with 52.29 g of Solvesso® 150 ND under stirring. 6.9 g of Geronol® FF6E (mixture of calcium dodecylbenzenesulphonate and polyarylphenol ethoxylated wherein dodecylbenzene sulphonate <15% by weight and polyarylphenol ethoxylated is comprised between about 25% and about 65% by weight, the difference to 100 being solvents and 2.96 g of Geronol® FF4E (mixture of calcium dodecylbenzenesulphonate and polyarylphenol ethoxylated wherein dodecylbenzene sulphonate is comprised between 25% and about 50% and polyarylphenolethyoxylated <25%, the difference to 100 being solvents, are added. Then about 14.85 of a mixture containing, as % by weight, 77% (11.43 g) of biodiesel and 23% (3.42 g) of ethylcellulose are added under stirring by heating at 40° C.

Example 2

The preparation of Example 1 was repeated but omitting the addition of the additive of the invention and adding amounts of solvent equal to those of biodiesel (11.43 g) and ethylcellulose (3.42 g) of example 1.

Example 3

Evaluation of the Odour of the Formulation of Example 1 and of Example 2 Comparative The method described in the characterization was used by employing the compositions of Example 1 and of example 2 comparative.

The results obtained (score) were the following:

| | |
|---|---|
| Composition Example 1 | 0.9 |
| Composition comparative | 2.6 |

The difference between the two score values was found statistically significant. This example shows that by using the formulation of Example 1 it is possible to reduce the odour of about 65% with respect to the formulation of Example 2 Comparative.

The invention claimed is:
1. An emulsifiable concentrate (EC formulation) comprising (% by weight):
10-40% of one or more actives selected among organophosphate compounds having the following structure (formula (I)):

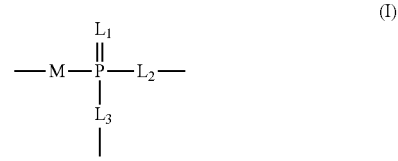

wherein:
$L_1$ is oxygen or sulphur,
$L_2$ and $L_3$, same or different from each other, are selected from oxygen, sulphur and a NH group,
with the proviso that at least one of $L_1$, $L_2$, and $L_3$ is sulphur and at least one of $L_1$, $L_2$, and $L_3$ is oxygen,
M is selected from oxygen, sulphur and NH;
1-20% of methyl or ethyl esters of fatty acids having a $C_{10}$-$C_{20}$ chain, saturated or unsaturated, and mixtures thereof (additive (A));
0.5-10% of a cellulose derivative soluble in the organic solvent of the EC formulation selected from cellulose alkylethers and carboxy alkyl cellulose esters (additive (B));
3-15% of one or more surfactants selected from non ionic and anionic surfactants, and mixtures thereof;
the complement to 100% being one or more organic solvents having the following characteristics:
capable of solubilizing the one or more active, expressed as % by weight, at room temperature (20-25° C.) for at least 5%; and
immiscible with water;
wherein the organic solvents are selected from the following group: alkylbenzenes having a number of carbon atoms from 7 to 20 and mixtures thereof, the alkyl being linear or branched; and linear or branched $C_7$-$C_9$ alkyl esters of acetic acid.
2. The formulation according to claim 1, wherein the organophosphate compounds have the following formula (II):

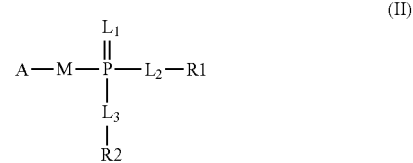

wherein:
$L_1$, $L_2$, $L_3$ and M are as defined above;
A is selected from the group consisting of:
(1) a linear or branched alkyl $C_1$-$C_{10}$ alkyl, optionally containing one or more heteroatoms, preferably one or two, selected from O, S, C=O, and S=O; wherein the hydrogen atoms of the $C_1$-$C_{10}$ alkyl chain are optionally substituted with one or more of the following groups: halogen; CH(COOR$_3$), and a radical of an ester of succinic acid of formula CH(COOR$_3$)CH$_2$(COOR$_3$), R$_3$ being $C_1$-$C_4$ alkyl; wherein when the $C_1$-$C_{10}$ alkyl is linear, the chain end carbon atom is optionally substituted with one or more halogen atoms;

when the $C_1$-$C_{10}$ alkyl is $C_1$, it is monosubstituted or disubstituted;

when the $C_1$-$C_{10}$ alkyl is monosubstituted $C_1$, one hydrogen atom of the alkyl is substituted with one of the following groups:

(C=O)—NH(CH$_3$), 1,3,4-thiadiazol-2(3H)-one-yl, wherein the hydrogen atom of the carbon atom at position 5 of the ring is substituted with a group $R_3$O alkoxy group wherein $R_3$ is as defined above;

phthalimido;

3,4-dihydro-4-oxobenzo[d]-[1,2,3]-triazinyl, 2,3-di-hydro-2-oxo-1,3-benzoxazolyl wherein the hydrogen atom of the carbon atom at position 6 of the ring is substituted with one halogen atom; and 2-oxo[1,3]-oxazol[4,5-b]pyridin-(2H)-yl wherein the hydrogen atom of the carbon atom at position 6 of the pyridinyl ring is substituted with halogen; and when the $C_1$-$C_{10}$ alkyl is disubstituted $C_1$, the substituents are respectively an ethoxycarbonyl group and a phenyl group;

(2) an aromatic ring of 6 carbon atoms having one or two substituents selected from the following group: halogen; CN; NO$_2$; SCH$_3$; $R_3$ and COOR$_3$, wherein $R_3$ is as defined above; and (3) a substituent selected from the following:

pyridinyl substituted with one or more halogen atoms; (C=O)CH$_3$, 2-oxo-2H-chromenyl wherein two hydrogen atoms, each linked to a different carbon atom of the ring, are substituted respectively with a halogen group and a $R_3$ group as defined above;

pyrimidinyl wherein a hydrogen atom of one or two carbon atoms of the ring is substituted with a group selected from halogen, $R_3$ as defined above, and diethylamino;

1,2-oxazolyl wherein the hydrogen atom of a carbon atom of the ring is substituted with a phenyl group;

pyrazolyl substituted with one phenyl group, said phenyl being optionally substituted with an halogen atom;

1,6-dihydro-6-oxo-pyridazinyl wherein a hydrogen atom of a carbon atom of the ring is substituted with a phenyl group;

and $R_1$ and $R_2$, same or different from each other are: hydrogen, and linear or branched $C_1$-$C_{10}$ alkyl, wherein when the alkyl is linear, the one or two COORS groups are present on the chain end carbon atom, wherein $R_3$ is as defined above.

3. The formulation according to claim 1 wherein the organophosphate compounds are selected from the group consisting of: acephate, azamethiphos, azinphos-ethyl, azinphos-methyl, cadusafos, chlorethoxyfos, chlorfenvinphos, chlormephos, chlorpyrifos, chlorpyrifos-methyl, couma-phos, cyanophos, demeton-S-methyl, diazinon, dichlofenthion, dichlorvos, dicrotophos, dimethoate, dimethylvinphos, disulfoton, ethoprophos, famphur, fenamiphos, fenitrothion, fenthion, heptenophos, isofenphos-methyl, isopropyl-O-(methoxyamino thiophosphoryl) salicylate, isoxa-thion, malathion, methamidophos, methidathion, mevinphos, monocrotophos, naled, omethoate, oxydemeton-methyl, parathion, parathion-methyl, phenthoate, phorate, phosalone, phosmet, phosphamidon, pirimiphos-methyl, profenofos, prothiofos, pyraclofos, pyridaphenthion, quinalphos, tebupirimfos, temephos, terbufos, thiometon, triazophos, trichlorfon, and vamidothion.

4. The formulation according to claim 3 wherein the organophosphate compounds are selected from the group consisting of chlorpyrifos, chlorpyrifos methyl, dimethoate and phosmet.

5. The formulation according to claim 1 wherein the methyl and/or ethyl esters of fatty acids having a $C_{10}$-$C_{20}$ chain, and mixtures thereof (additive (A)) are obtained by transesterification of vegetal oils selected from rape oil, soya oil, sunflower seed oil and canola oil with methyl or ethyl alcohol; the chain of said $C_{10}$-$C_{20}$ acids optionally contains one or more unsaturations of the ethylene type, in a number not higher than 3 and in alternated positions along the chain.

6. The formulation according to claim 5 wherein the methyl and/or ethyl esters of fatty acids having a $C_{10}$-$C_{20}$ chain, and mixtures thereof (additive (A)) are characterized by the following analytical parameters:

| | |
|---|---|
| Acid value (mg KOH/g) | ≤1 |
| Iodine value (g I$_2$/100 g) | 105-120 |
| Residual water (% by weight) | ≤0.2 |
| Density at 25° C. (g/ml) | 0.875-0.877. |

7. The formulation according to claim 1 wherein the additive (B) is in an amount, expressed as percent by weight with respect to additive LA), of between 5 and 40%, the amount of additive (B), with respect to the composition of the solvent formulation under the EC formulation (% by weight) being in the range ≥0.5% and ≤8%.

8. The formulation according to claim 1 wherein the alkyl of the alkylethers of cellulose is $C_1$-$C_5$ and in the carboxyalkylcellulose esters the ester group has a $C_1$-$C_4$ alkyl chain and the alkyl of carboxyalkylcellulose is $C_1$-$C_4$.

9. The formulation according to claim 1 wherein the non ionic surfactants are selected from the group consisting of: linear or branched polyethoxylated $C_{10}$-$C_{18}$ fatty alcohols, wherein the ethoxyl number (EO) ranges from 5 to 10; polyethoxylated castor oil wherein the ethoxyl number ranges from 15 to 40; polyethoxylated distyrylphenols having an ethoxyl number between 12-25; polyethoxylated tristyrylphenols having an ethoxyl number between 15 and 40; $C_{12}$-$C_{18}$ mono- di and tri-esters of polyethoxylated sorbitan wherein the ethoxyl number ranges from 4 to 20; $C_{10}$-$C_{16}$ mixtures of alkyl polyglycosides optionally polyethoxylated or polypropoxylated wherein said alkylpolyglycosides have a different ethoxyl or propoxyl number, comprised between 10 and 25; polyethoxylated-polypropoxylated $C_8$-$C_{14}$ aliphatic alcohols; and polyaryl phenolethoxylate wherein the ethoxyl/propoxyl number is between 15 and 40.

10. The formulation according to claim 1 wherein the anionic surfactants are selected from the group consisting of: alkaline or alkaline-earth salts of $C_8$-$C_{16}$ alkylbenzensulphonates; and alkaline or earth-alkaline salts of $C_{10}$-$C_{14}$ alkylsulphates.

11. The formulation according to claim 1 wherein a mixture of non ionic and anionic surfactants is included in the formulation.

12. The formulation according to claim 11, wherein the percentage of non ionic surfactants is in the range from 40 to 80% with respect to the total percent weight of the surfactants of the EC formulation.

13. The formulation according to claim 1 comprising as optional components pesticides of classes different than organophosphates, said optional pesticides being soluble in the one or more organic solvent at the used concentrations, the solvent percentage being decreased by an amount equal to that of the optional pesticides added.

14. A process for preparing the formulation of claim 1 comprising the following steps:
   a) solubilization of the organophosphate compounds and optional pesticides in the one or more organic solvent used for the EC preparation,
   b) addition of one or more surfactants selected from non ionic and anionic surfactants and mixtures thereof,
   c) addition of the additive (A) and of additive (B), optionally by heating at temperatures not higher than 40° C.

15. A method of reducing odor associated with organophosphates present in a composition, the method comprising
   (a) providing a solution having one or more organophosphate compounds in an organic solvent, to which one or more surfactants selected from non-ionic and anionic surfactants or a mixture thereof is added, wherein the one or more organophosphates are defined by formula I of claim 1;
   (b) adding additives A) and B) according to claim 1, thereby obtaining an emulsifiable concentrate (EC); and
   (b) diluting the EC with water at an application dose prior to field distribution.

* * * * *